(12) United States Patent  (10) Patent No.: US 7,773,916 B2
Jackson et al.  (45) Date of Patent: Aug. 10, 2010

(54) SYSTEM AND METHOD FOR TRANSFERRING FEATURES TO A SUBSTRATE

(75) Inventors: Bruce J. Jackson, Star, ID (US); Judson Leiser, Corvallis, OR (US); Peter Gysling, New Plymouth, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 11 days.

(21) Appl. No.: 12/353,814

(22) Filed: Jan. 14, 2009

(65) Prior Publication Data

US 2009/0123180 A1  May 14, 2009

Related U.S. Application Data

(62) Division of application No. 11/154,927, filed on Jun. 16, 2005, now Pat. No. 7,592,117.

(51) Int. Cl.
*G03G 15/01* (2006.01)
(52) U.S. Cl. ........................................ 399/233
(58) Field of Classification Search ................ 399/226, 399/233, 249, 251, 296, 302
See application file for complete search history.

(56) References Cited

U.S. PATENT DOCUMENTS

| | | | |
|---|---|---|---|
| 5,361,089 A | 11/1994 | Bearss et al. | |
| 5,406,359 A | 4/1995 | Fletcher | |
| 5,420,676 A | 5/1995 | Arcaro | |
| 5,737,677 A | 4/1998 | Tombs et al. | |
| 5,765,084 A | 6/1998 | Asada et al. | |
| 5,915,144 A | 6/1999 | Ide et al. | |
| 5,926,679 A | 7/1999 | May et al. | |
| 6,165,669 A | 12/2000 | Zhao et al. | |
| 6,309,786 B1 | 10/2001 | Zhao et al. | |
| 6,594,463 B2 | 7/2003 | Watanabe | |
| 6,653,041 B2 | 11/2003 | Payne et al. | |
| 6,684,048 B2 | 1/2004 | Caruthers et al. | |
| 6,741,827 B2 | 5/2004 | Lee | |
| 7,433,635 B2 * | 10/2008 | Chou et al. | 399/296 |
| 2002/0164181 A1 | 11/2002 | Parker et al. | |
| 2004/0005175 A1 | 1/2004 | Lee | |

FOREIGN PATENT DOCUMENTS

| | | |
|---|---|---|
| EP | 549867 A2 | 7/1993 |
| JP | 57198478 A | 6/1982 |
| JP | 05053406 A | 5/1993 |
| JP | 06175510 A | 6/1994 |
| JP | 06186787 A | 8/1994 |
| JP | 2004110066 A | 8/2004 |

OTHER PUBLICATIONS

Research Disclosure, Jun. 2004, No. 482012, Disclosed anonymously, Kenneth Mason Publications(ISSN 0374-4353) <www.researchdisclosure.com>.

* cited by examiner

*Primary Examiner*—Stephen D Meier
*Assistant Examiner*—Gregory H Curran

(57) ABSTRACT

A method comprising generating a clear layer on a first surface using a transparent liquid toner, generating a color layer using a pigmented liquid toner over the clear layer on the first surface, and transferring the clear layer and the color layer from the first surface to a substrate is provided.

16 Claims, 6 Drawing Sheets

SYSTEM AND METHOD FOR TRANSFERRING FEATURES TO A SUBSTRATE

CROSS-REFERENCE TO RELATED APPLICATIONS

This Application is a divisional of U.S. patent application Ser. No. 11/154,927, filed Jun. 16, 2005, now U.S. Pat. No. 7,592,117, which is hereby incorporated by reference in its entirety.

BACKGROUND

Electrophotography processes may be used to create features on a substrate such as paper or a glass panel. The features are often created on a photoconductor drum using an imaging system before being transferred to the substrate using an electrostatic process. As the size of features decreases, the difficulty in reliably transferring the features to a substrate may increase. It would be desirable to increase the reliability of transferring features to a substrate in an electrophotography process.

SUMMARY

One form of the present invention provides a method comprising generating a clear layer on a first surface using a transparent liquid toner, generating a color layer using a pigmented liquid toner over the clear layer on the first surface, and transferring the clear layer and the color layer from the first surface to a substrate.

DETAILED DESCRIPTION

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

As described herein, a system and method for transferring features to a substrate using a clear layer in a liquid electrophotography (LEP) process is provided. According to one embodiment, the clear layer is generated on a photoconductor drum using a transparent liquid toner. The clear layer is transferred from the photoconductor drum to an intermediate transfer member. One or more color features are generated in one or more color layers using the photoconductor drum and transferred onto the clear layer on the intermediate transfer member. The clear layer and the color layers are transferred from the intermediate transfer member onto a substrate such as paper, a display panel, or a printed circuit board.

According to one embodiment, a system and method for creating layers on a front panel of a liquid crystal display (LCD) using a clear layer in a liquid electrophotography (LEP) process is provided. In addition to the clear layer, the layers may include one or more color filter layers, a black matrix layer, a planarization layer, and a dielectric layer, for example. Using the system and method, each layer is generated on a photoconductor drum and transferred to an intermediate transfer medium such as a blanket. The combined layers on the intermediate transfer medium are transferred to a substrate that comprises the front panel of a liquid crystal display (LCD).

Figure 1:
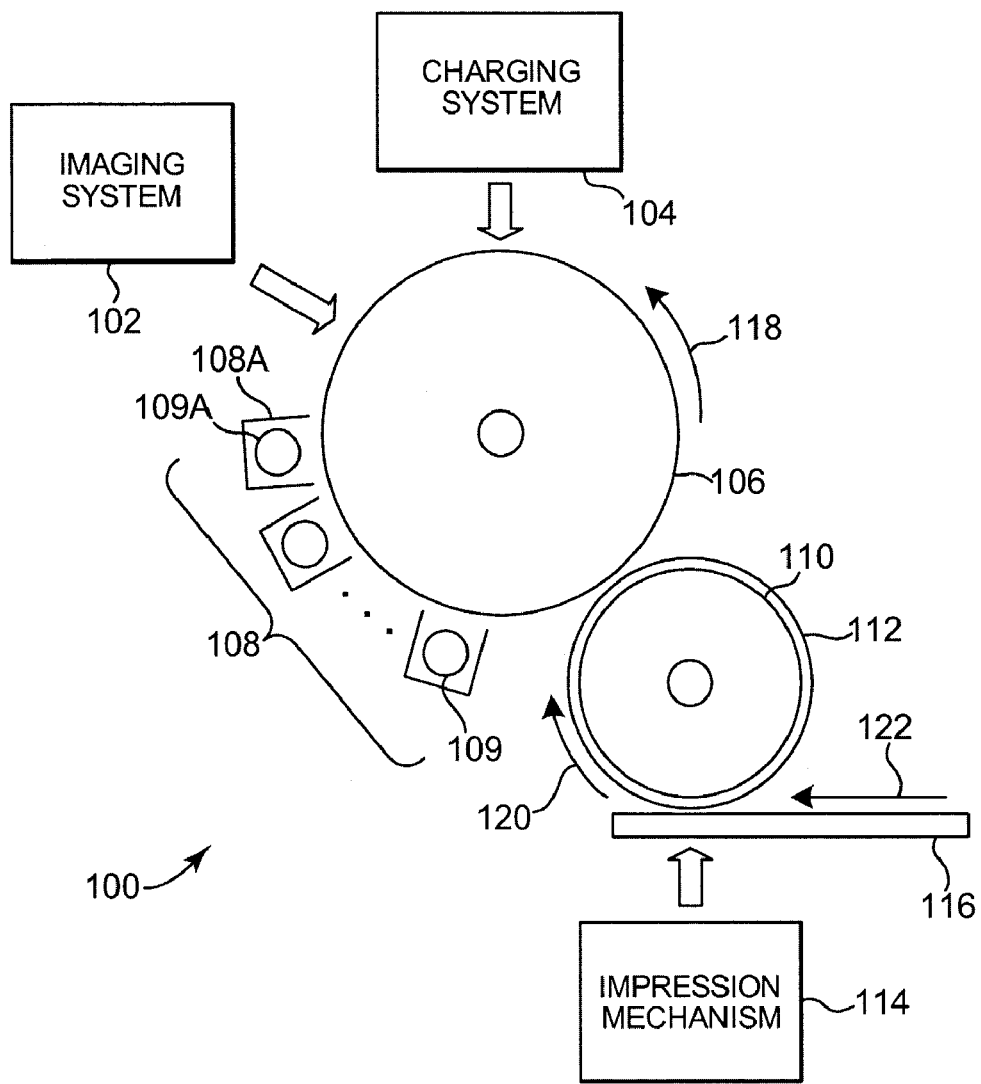
FIG. 1 is a schematic diagram illustrating a system for generating and transferring features to a substrate using a liquid electrophotography process according to one embodiment of the present invention.

FIG. 1 is a schematic diagram illustrating a system 100 for generating and transferring features to a substrate 116 using a liquid electrophotography process. System 100 includes an imaging system 102, a charging system 104, a cylindrical photoconductor drum 106, one or a plurality of liquid toner cartridges 108, a cylindrical intermediate transfer member 110 that includes a blanket 112, and an impression mechanism 114.

Imaging system 102 is a laser imager configured to create a latent image on photoconductor drum 106. Charging system 104 includes a scorotron assembly (not shown) that includes one or more scorotron units (not shown). The scorotron units are configured to negatively charge photoconductor drum 106 as photoconductor drum 106 is rotated past charging system 104 as indicated by an arrow 118. Image system 102 includes at least one writing head configured to project a laser beam onto selected areas of photoconductor drum 106 to discharge the selected areas as photoconductor drum 106 is rotated past imaging system 102. The discharged areas of photoconductor drum 106 comprise the latent image.

Each of the liquid toner cartridges 108 includes a developer 109 and liquid toner of a selected type and color, e.g., clear, red, green, blue, or black. The liquid toner comprises particles that have been milled into a transparent or pigmented plastic and dissolved into Isopar™, i.e., an Isoparaffinic solvent available from ExxonMobil Chemical Company, 13501 Katy Freeway, Houston, Tex. 77079 USA, or other suitable carrier liquid along with a charge director.

Liquid toner cartridge 108A includes developer 109A and a transparent liquid toner that is used to create a clear layer on photoconductor drum 106. In response to being activated, liquid toner cartridge 108A develops the transparent liquid toner using developer 109A. As discharged areas of photoconductor drum 106 pass over activated liquid toner cartridge 108A, transparent liquid toner transfers from developer 109A in activated liquid toner cartridge 108A to the discharged areas of photoconductor drum 106 to create a clear layer. In one embodiment, the clear layer covers the entire dischargable area of photoconductor drum 106. In another embodiment, the clear layer covers selected portions or regions of photoconductor drum 106 as selectively discharged by imaging system 102.

The clear layer is transferred electrostatically from photoconductor drum 106 to blanket 112 as photoconductor drum 106 rotates past intermediate transfer member 110. Intermediate transfer member 110 rotates in the direction indicated by arrow 120. In one embodiment, blanket 112 comprises a multi-layer fabric-reinforced foam rubber configured to electrostatically transfer the liquid toner from photoconductor drum 106 to intermediate transfer member 110. In other embodiments, blanket 112 comprises another type of material. Intermediate transfer member 110 heats the clear layer on blanket 112 to cause the Isopar or other carrier liquid in the image to evaporate. Blanket 112 may also absorb some of the Isopar or other carrier liquid in the clear layer to increase the solid content of the clear layer.

System 100 may repeat the above process to generate additional clear layers on blanket 112. The additional clear layers effectively form a single clear layer on blanket 112. By adding additional clear layers, the thickness of the clear layer on blanket 112 may be increased.

Subsequent to generating the clear layer on blanket 112, an activated liquid toner cartridge 108 develops pigmented liquid toner using developer 109 to create features that comprise a color layer. As discharged areas of photoconductor drum 106 pass over an activated liquid toner cartridge 108, liquid toner transfers from developer 109 in activated liquid toner cartridge 108 to the discharged areas of photoconductor drum 106 to create the color layer.

The color layer is transferred electrostatically from photoconductor drum 106 onto the clear layer on blanket 112 as photoconductor drum 106 rotates past intermediate transfer member 110 in the direction indicated by arrow 120. Intermediate transfer member 110 heats the color layer on blanket 112 to cause the Isopar or other carrier liquid in the image to evaporate. Blanket 112 also absorbs some of the Isopar or other carrier liquid in the image to increase the solid content of the image.

A discharge system (not shown) such as a light emitting diode (LED) erase lamp may remove residual charge from photoconductor drum 106 prior to a layer being transferred to blanket 112. After a layer is transferred to blanket 112, a cleaning system (not shown) may clean photoconductor drum 106 to remove any remaining toner.

System 100 repeats the above process to create any number of additional color layers on the clear layer on blanket 112. The additional color layers may be the same type and/or color, i.e. use liquid toner from the same liquid toner cartridge 108, or may be a different type and/or color, i.e. use liquid toner from a different liquid toner cartridge 108 as any previous layers.

After all of the layers have been created on blanket 112, the combined image is transferred from blanket 112 to substrate 116 using impression mechanism 114 such that all or substantially all of the clear layer is transferred from blanket 112 to substrate 116. Impression mechanism 114 drives substrate 116 along intermediate transfer member 110 in the direction indicated by an arrow 122 and applies pressure to substrate 116 to cause the combined image, i.e. all clear and color layers created on blanket 112, to be transferred to substrate 116.

Figure 2A:
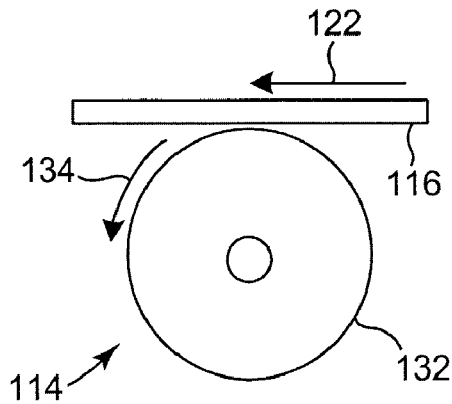
FIG. 2A is a schematic diagram illustrating an impression mechanism according to one embodiment of the present invention.

FIG. 2A is a schematic diagram illustrating an embodiment of impression mechanism 114. In FIG. 2A, impression mechanism 114 comprises an impression cylinder 132 that rotates in the direction indicated by an arrow 134 to drive substrate 116 between intermediate transfer member 110 (shown in FIG. 1) and impression cylinder 132 in the direction indicated by arrow 122. As substrate 116 passes between intermediate transfer member 110 and impression cylinder 132, impression cylinder 132 also applies pressure between substrate 116 and intermediate transfer member 110 to cause the combined image, i.e. all layers created on blanket 112, to be transferred to substrate 116.

Figure 2B:
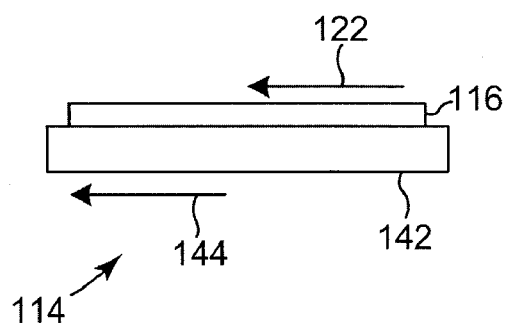
FIG. 2B is a schematic diagram illustrating an impression mechanism according to one embodiment of the present invention.

FIG. 2B is a schematic diagram illustrating another embodiment of impression mechanism 114. In FIG. 2B, impression mechanism 114 comprises a platen 142 that is driven in the direction indicated by an arrow 144 to drive substrate 116 between intermediate transfer member 110 (shown in FIG. 1) and platen 142 in the direction indicated by arrow 122. As substrate 116 passes between intermediate transfer member 110 and platen 142, platen 142 also applies pressure between substrate 116 and intermediate transfer member 110 to cause the combined image, i.e. all layers created on blanket 112, to be transferred to substrate 116.

In one embodiment, the clear layer acts as a release layer between additional color layers generated on photoconductor drum 106 and transferred onto the clear layer on blanket 112. Neither the clear layer nor the color layer or layers are sintered prior to being transferred from blanket 112 to substrate 116. The clear layer enhances the transfer of the clear and color layers onto substrate 116 to increase the reliability of transferring features, such as relatively small features (e.g., a line 10 microns wide by 20 microns long), in the color layers from blanket 112 to substrate 116. The relatively small features may comprise half-toned regions or other areas where an image includes relatively small dots of toner. In addition, the clear layer may serve as an overcoat layer to add gloss to or protect the image formed by the color layers on the substrate.

In one embodiment, imaging system 102 may be configured to discharge only portions of photoconductor drum 106 that correspond to relatively small features in generating the clear layer. In this embodiment, the clear layer may be used explicitly for the purpose of enhancing the transfer of the relatively small features of one or more color layers from blanket 112 onto substrate 116.

In one embodiment, the combination of substrate 116 and the layers transferred to substrate 116 are referred to herein as display panel 116. Substrate 116 comprises any material suitable for use as a display panel for a LCD device such as glass or clear plastic. In this embodiment, liquid toner cartridge 108A includes a transparent liquid toner that is used to create a clear layer. One liquid toner cartridge 108 includes a black pigment that is used to create a black matrix layer. Three liquid toner cartridges 108 include red, green, and blue pigments, respectively, that are used to create color filter layers. One liquid toner cartridge 108 includes a transparent material that is used to create a planarization layer, and one liquid toner cartridge 108 includes a dielectric material that is used to create a dielectric layer. In other embodiments, system 100 includes other types or numbers of liquid toner cartridges 108.

In other embodiments, photoconductor drum 106 includes a permanent pattern that comprises the latent image. In those embodiments, imaging system 102 may be omitted.

Figure 3:
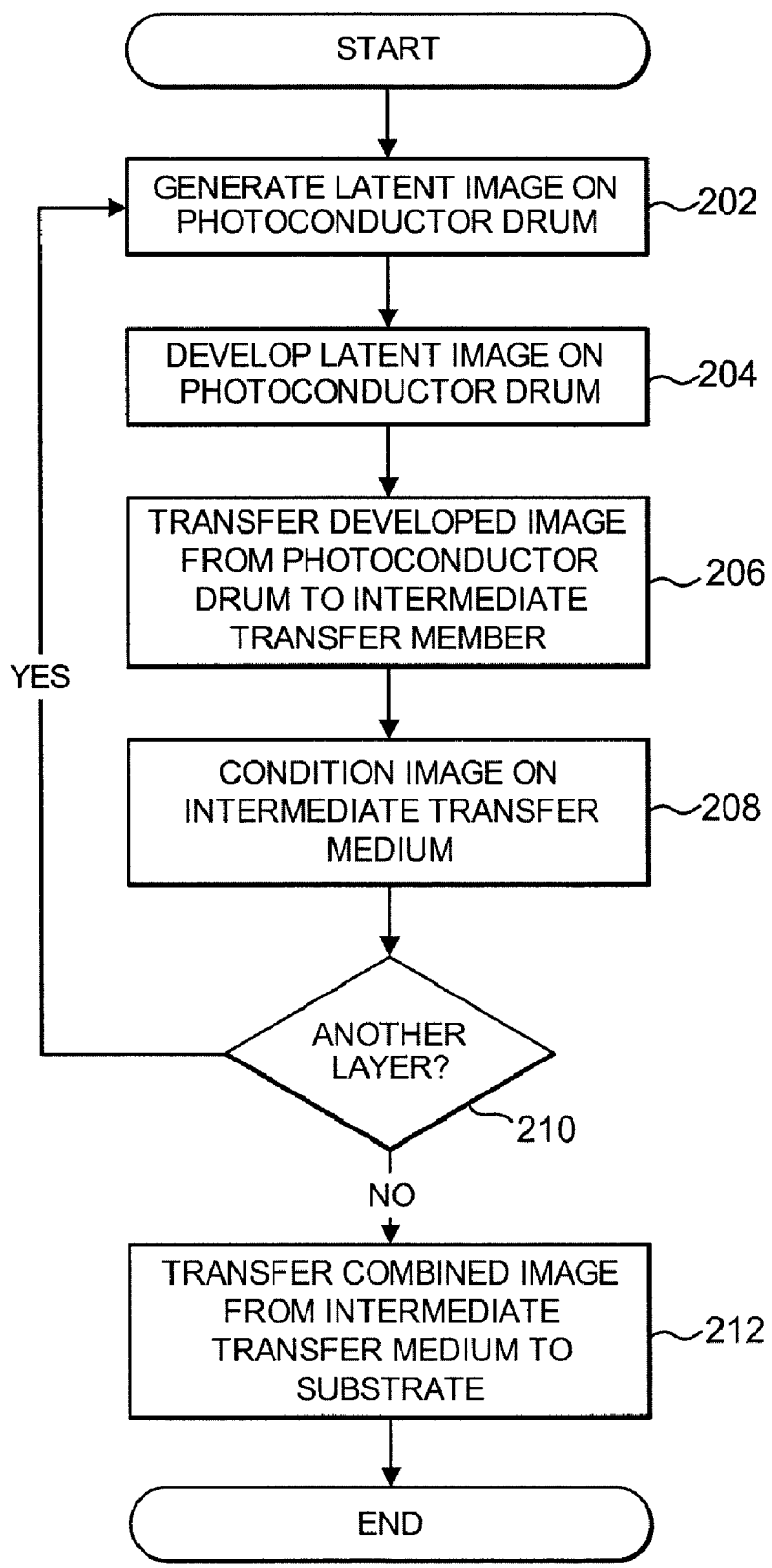
FIG. 3 is a flow chart illustrating a method for generating and transferring features to a substrate using a liquid electrophotography process according to one embodiment of the present invention.

FIG. 3 is a flow chart illustrating a method for generating and transferring features to a substrate using a liquid electrophotography process. The method of FIG. 3 will be described with reference to system 100.

In FIG. 3, a latent image is generated on photoconductor drum 106 as indicated in a block 202. In system 100, imaging system 102 discharges selected areas of photoconductor drum 106 that have been negatively charged by charging system 104 to generate the latent image. The latent image is developed on photoconductor drum 106 as indicated in a block 204. An activated liquid toner cartridge 108 applies liquid toner to the discharged areas of photoconductor drum 106 to develop the latent image.

The developed image is transferred from photoconductor drum 106 to intermediate transfer member 110 as indicated in a block 206. To transfer the developed image from photoconductor drum 106 to intermediate transfer member 110, an electrical bias is applied to blanket 112 to cause the charged liquid toner that comprises the developed image to transfer to blanket 112 on intermediate transfer member 110.

The image is conditioned on intermediate transfer member 110 as indicated in a block 208. Intermediate transfer member 110 heats blanket 112 to cause the Isopar in the liquid toner to evaporate and the plastic-coated particles in the liquid toner to form a film to condition the image. By evaporating the Isopar, the liquid toner solidifies on blanket 112.

A determination is made as to whether there is another layer to generate as indicated in a block 210. If there is another layer to generate, then the process of blocks 202 through 208 is repeated for the next layer. The next layer may be generated using liquid toner from the same or a different liquid toner cartridge 108 as the previous layer.

In one embodiment, at least the first layer generated by performing the functions of blocks 202 through 208 comprises a clear layer formed by a transparent liquid toner. Additional clear layers may also be generated onto the first clear layer prior to any color layers. One or more color layers are generated on top of the clear layer or layers by performing the functions of blocks 202 through 208 subsequent to generating the clear layer or layers.

If there is not another layer to generate as determined in block 210, then the combined image, i.e. the images and features from each layer generated in the process of blocks 202 through 210, is transferred from intermediate transfer member 110 to substrate 116 as indicated in a block 212. Impression mechanism 114 drives substrate 116 between intermediate transfer member 110 and impression mechanism 114 and applies pressure between substrate 116 and intermediate transfer member 110 to cause the combined image to be transferred to substrate 116 such that all or substantially all of the clear layer is transferred from blanket 112 to substrate 116. The combined image is transferred from intermediate transfer member 110 to substrate 116 without sintering the clear or color layers.

In one embodiment of the method of FIG. 3, the layers generated and transferred to substrate 116 include a clear layer, a black matrix layer, a color filter layer, a planarization layer, and a dielectric layer. Each layer may be created using one or more than one iteration of the functions shown in blocks 202 through 208. In other embodiments, more or fewer layers may be generated and transferred to substrate 116.

Figure 4:
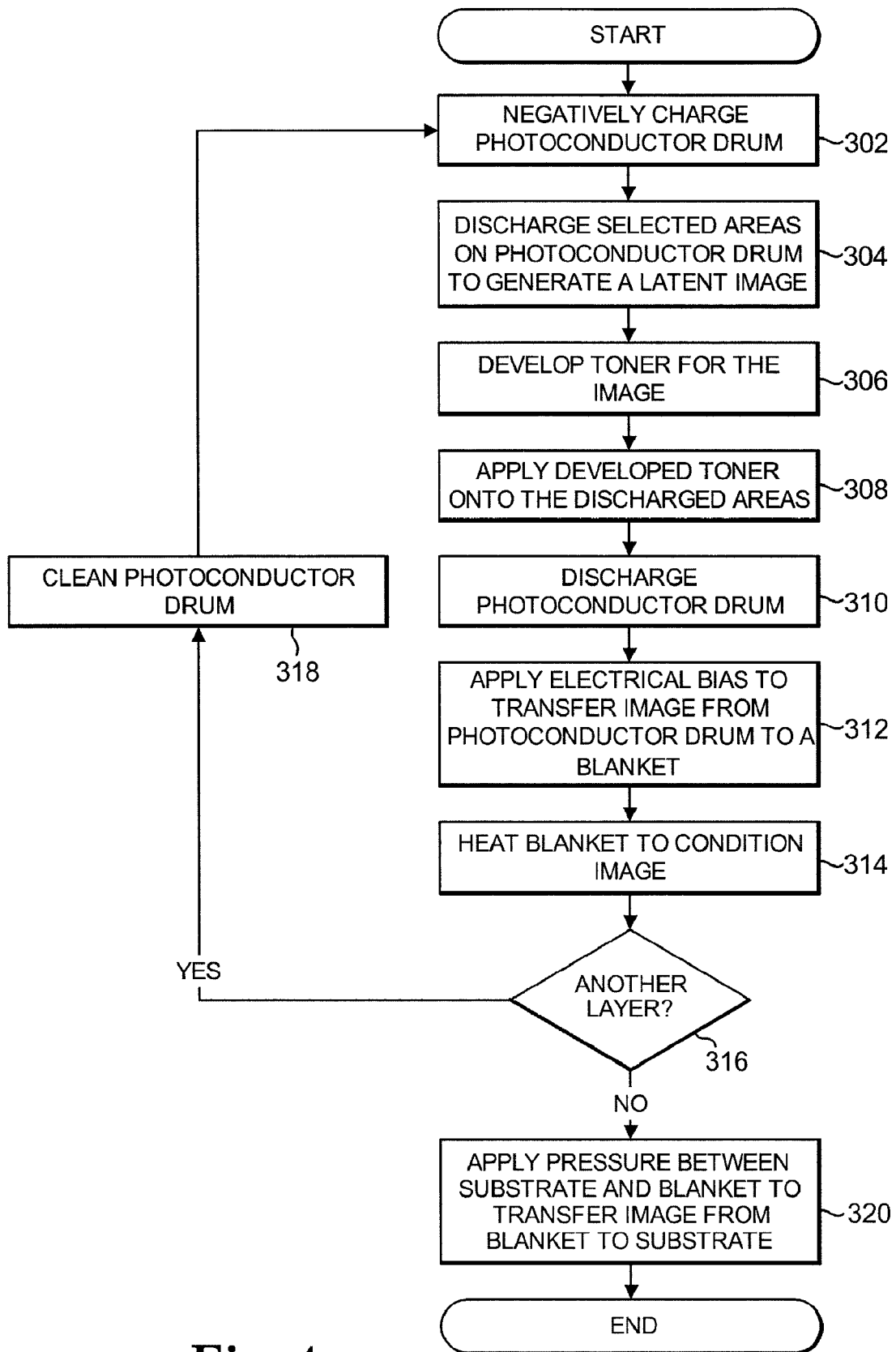
FIG. 4 is a flow chart illustrating a method for generating and transferring features to a substrate with a blanket using a liquid electrophotography process according to one embodiment of the present invention.

FIG. 4 is a flow chart illustrating a method for generating and transferring layers to a substrate with a blanket using a liquid electrophotography process. The method of FIG. 4 will be described with reference to system 100.

In FIG. 4, charging system 104 negatively charges photoconductor drum 106 as indicated in a block 302. Imaging system 102 discharges selected areas on photoconductor drum 106 to generate a latent image on photoconductor drum 106 as indicated in a block 304. A liquid toner cartridge 108 is activated to develop toner for the image as indicated in a block 306. The activated liquid toner cartridge 108 applies developed toner to the discharged areas of photoconductor drum 106 to develop the latent image as indicated in a block 308. A discharging system (not shown) discharges photoconductor drum 106 as indicated in a block 310.

An electrical bias is applied to intermediate transfer member 110 to transfer the image from photoconductor drum 106 to blanket 112 as indicated in a block 312. Intermediate transfer member 110 heats blanket 112 to condition the image by causing the Isopar in the liquid toner to evaporate and the plastic-coated particles in the liquid toner to form a film as indicated in a block 314.

A determination is made as to whether there is another layer to generate as indicated in a block 316. If there is another layer to generate, then photoconductor drum 106 is cleaned to remove any remaining toner as indicated in a block 318 and the process of blocks 302 through 314 is repeated for the next layer. The next layer may be generated using liquid toner from the same or a different liquid toner cartridge 108 as the previous layer.

In one embodiment, at least the first layer generated by performing the functions of blocks 302 through 314 comprises a clear layer formed by a transparent liquid toner. Additional clear layers may also be generated onto the first clear layer prior to any color layers. One or more color layers are generated on top of the clear layer or layers by performing the functions of blocks 302 through 314 subsequent to generating the clear layer or layers.

If there is not another layer to generate as determined in block 316, then impression mechanism 114 applies pressure between substrate 116 and intermediate transfer member 110 to cause the combined image to be transferred from blanket 112 to substrate 116 as impression mechanism 114 drives substrate 116 between intermediate transfer member 110 and impression mechanism 114 as indicated in a block 320. All or substantially all of the clear layer is transferred from blanket 112 to substrate 116. The combined image is transferred from blanket 112 to substrate 116 without sintering the clear or color layers.

In one embodiment of the method of FIG. 4, the layers generated and transferred to substrate 116 include a clear layer, a black matrix layer, a color filter layer, a planarization layer, and a dielectric layer. Each layer may be created using one or more than one iteration of the functions shown in blocks 202 through 208. In other embodiments, more or fewer layers may be generated and transferred to substrate 116.

Figure 5:
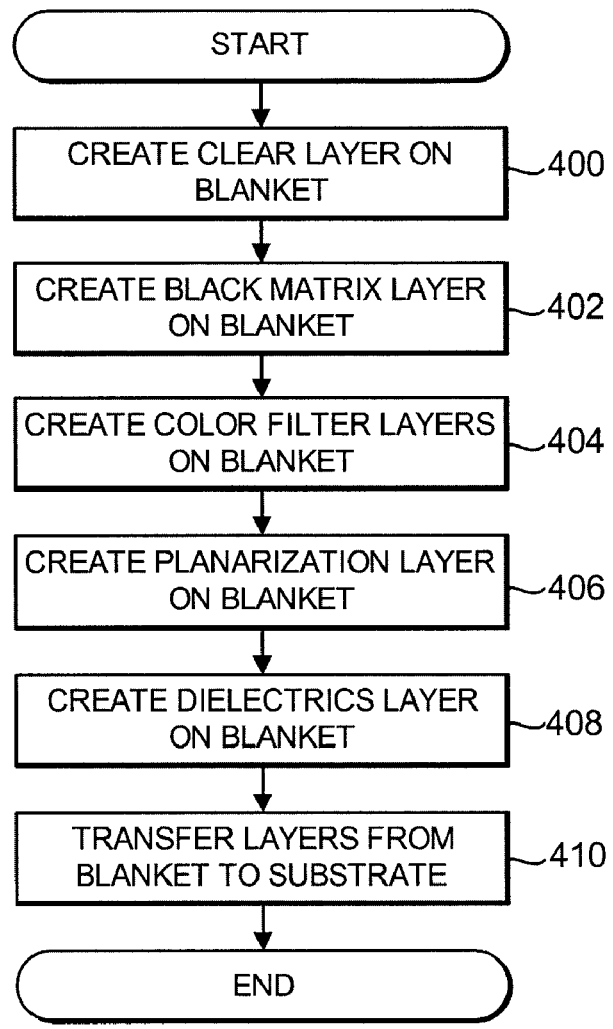
FIG. 5 is a flow chart illustrating a method for generating and transferring layers of a display panel to a substrate using a liquid electrophotography process according to one embodiment of the present invention.

FIG. 5 is a flow chart illustrating a method for generating and transferring optical layers of a display panel to substrate 116 using a liquid electrophotography process as described above with reference to the embodiments of FIGS. 2 and 3. In particular, each layer in the embodiment of FIG. 5 is created using either substantially the functions of blocks 202 through 208 of FIG. 3 or substantially the functions of blocks 302 through 314 and 318 of FIG. 4. The creation of each layer may involve one or more iterations of the functions of blocks 202 through 208 of FIG. 3 or the functions of blocks 302 through 314 and 318 of FIG. 4.

In FIG. 5, a clear layer is created on blanket 112 as indicated in a block 400. The clear layer may comprise one or more layers generated using transparent liquid toner. In one embodiment, the clear layer covers all or substantially all of blanket 112. In another embodiment, the clear layer covers selected portions of blanket 112 where the selected portions correspond to features created in the black matrix, color, planarization, and/or dielectric layers created in blocks 402 through 408. A black matrix layer is created on blanket 112 as indicated in a block 402. Color filter layers are created on blanket 112 as indicated in a block 404. A planarization layer is created on blanket 112 as indicated in a block 406. A dielectric layer is created on blanket 112 as indicated in a block 408. The optical layers, including the clear, black matrix, color filter, planarization, and dielectric layers, are simultaneously transferred to substrate 116 as indicated in a block 410 and collectively comprise a color filter.

Figure 6:
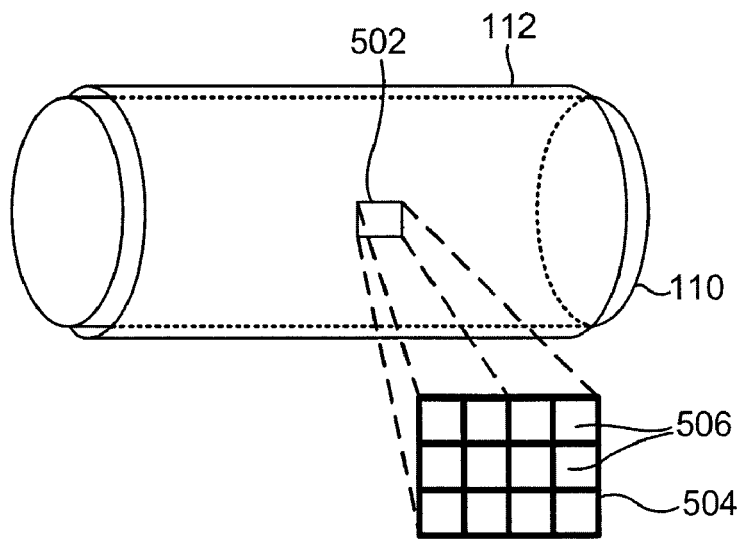
FIG. 6 is a schematic diagram illustrating layers transferred to a blanket as part of a liquid electrophotography process according to one embodiment of the present invention.

FIG. 6 is a schematic diagram illustrating layers transferred to blanket 112 as part of a liquid electrophotography process as described above with reference to the embodiments of FIGS. 1 through 4. As shown in a selected portion 502 of blanket 112, the layers created on blanket 112 include a black matrix layer 504 and color filter layers 506 interspersed in black matrix layer 504. The layers also include at least a clear layer (not shown), a planarization layer (not shown), and a dielectric layer (not shown). Other embodiments include patterns of black matrix layer 504 other than the pattern shown in FIG. 6.

Figure 7A:
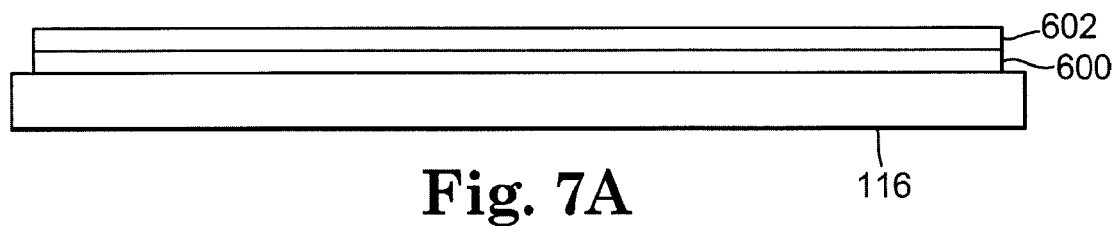
FIG. 7A is a schematic diagram illustrating a first perspective of layers transferred to a display panel using a liquid electrophotography process according to one embodiment of the present invention.
Figure 7B:
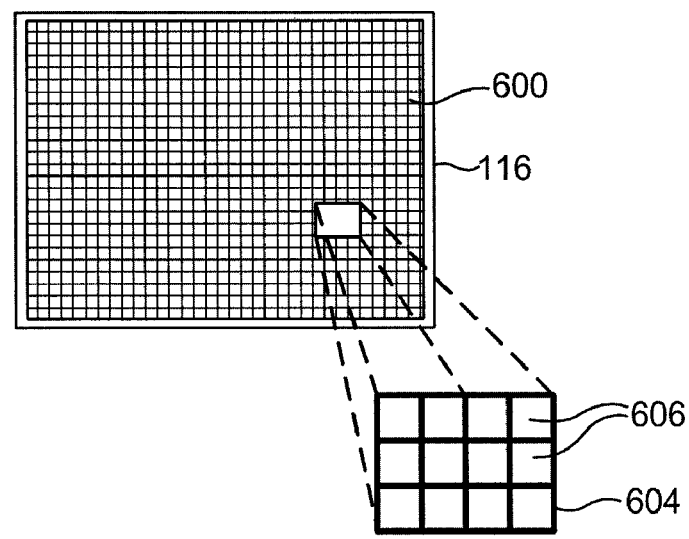
FIG. 7B is a schematic diagram illustrating a second perspective of layers transferred to a display panel using a liquid electrophotography process according to one embodiment of the present invention.

FIGS. 7A and 7B are schematic diagrams illustrating first and second perspectives of a color filter 600 transferred to display panel 116 using a liquid electrophotography process as described above with reference to the embodiments of FIGS. 1 through 4. FIG. 7A illustrates a side view showing color filter 600 on display panel 116. Color filter 600 includes a clear layer 602 over the remaining layers of color filter 600. FIG. 7B illustrates a top view where an expanded portion shows a black matrix layer 604 and color filter layers 606 interspersed in black matrix layer 604. Other embodiments include patterns of black matrix layer 604 other than the pattern shown in FIG. 7B.

Figure 8:
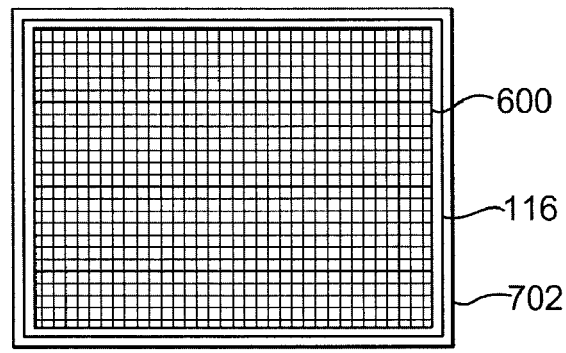
FIG. 8 is a schematic diagram illustrating a liquid crystal display (LCD) device according to one embodiment of the present invention.

FIG. 8 is a schematic diagram illustrating a liquid crystal display (LCD) device 702. LCD device 702 includes display panel 116 with color filter 600 and other components that are configured to display still or video images. The other components may include a rear panel (not shown) that is combined with display panel 116 to house liquid crystal material. The rear panel may include a transistor or diode and conductive interconnect lines for each pixel formed in display panel 116. Each transistor or diode is operated to cause an associated pixel in display panel 116 to transmit or not transmit light according to an image to be displayed.

LCD device 702 comprises any type of LCD device such as a flat screen or rear projection television, a personal computer system display, a laptop or notebook computer system display, or a video or image display system, for example.

Figure 9:
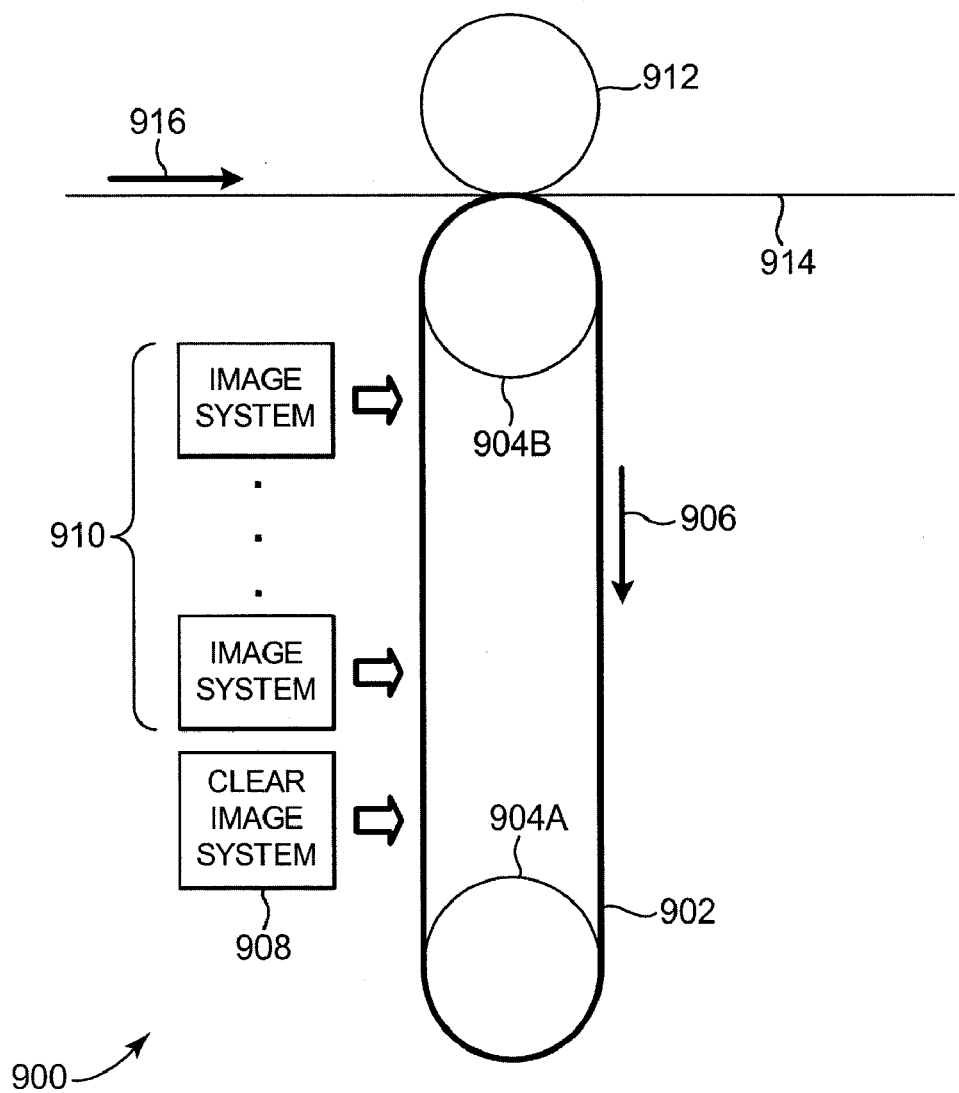
FIG. 9 is a schematic diagram illustrating a system for generating and transferring features to a substrate using a liquid electrophotography process according to one embodiment of the present invention.

FIG. 9 is a schematic diagram illustrating a system 900 for generating and transferring features to a substrate 914 using a liquid electrophotography process. System 900 includes a belt 902 that is rotated by cylindrical members 904A and 904B in a direction indicated by an arrow 906. As belt 902 rotates past a clear image system 908, clear image system 908 creates a clear layer on belt 902 using a transparent liquid toner. In addition, image systems 910 create one or more color layers on the clear layer of belt 902 using one or more liquid toners. The clear and color layers are transferred from belt 902 to substrate 914 using an impression cylinder 912. Impression cylinder 912 and cylindrical member 904B drives substrate 914 in the direction indicated by an arrow 916. As substrate 914 passes between impression cylinder 912 and cylindrical member 904B, impression cylinder 912 applies heat and/or pressure to substrate 914 and belt 902 to cause the clear and color layers to be transferred from belt 902 to substrate 914.

Figure 10:
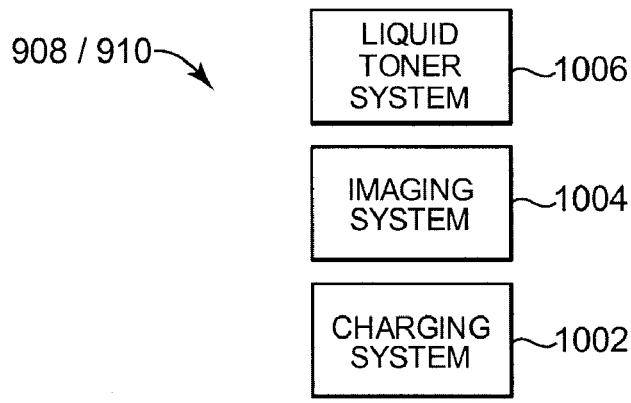
FIG. 10 is a schematic diagram illustrating an image system according to one embodiment of the present invention.

Clear image system 908 and image systems 910 each include a charging system 1002, an imaging system 1004, and a liquid toner system 1006 as shown in the embodiment of FIG. 10. Charging system 1002 includes a scorotron assembly (not shown) that includes one or more scorotron units (not shown). The scorotron units are configured to negatively charge belt 902 as belt 902 is rotated past charging system 104. Imaging system 1004 is a laser imager configured to create a latent image on belt 902. Imaging system 1004 includes at least one writing head configured to project a laser beam onto selected areas of belt 902 to discharge the selected areas as belt 902 is rotated past imaging system 1004. The discharged areas of belt 902 comprise the latent image.

Each of the liquid toner systems 1006 includes a developer (not shown) and liquid toner (not shown) of a selected type and color, e.g., clear, red, green, blue, or black. The liquid toner comprises particles that have been milled into a transparent or pigmented plastic and dissolved into Isopar or other suitable carrier liquid along with a charge director.

Clear image system 908 includes a transparent liquid toner that is used to create a clear layer on belt 902. In response to being activated, clear image system 908 transfers transparent liquid toner from the developer to discharged areas of belt 902 to create a clear layer. In one embodiment, the clear layer covers the entire dischargable area of belt 902. In another embodiment, the clear layer covers selected portions or regions of belt 902 as selectively discharged by imaging system 1004.

Subsequent to generating the clear layer on belt 902, an activated image system 910 transfers pigmented liquid toner from the developer to areas of belt 902 discharged by imaging system 1004 over the clear layer to create a color layer on top of the clear layer. Additional image systems 910 may create additional color layers on top of the clear layer and any color layers.

After all of the layers have been created on belt 902, the combined image is transferred from belt 902 to substrate 914 using impression cylinder 912 as described above. All or substantially all of the clear layer is transferred from belt 902 to substrate 914. The combined image is transferred from belt 902 to substrate 914 without sintering the clear or color layers.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An apparatus comprising:
   a photoconductor drum;
   a first liquid toner cartridge;
   a second liquid toner cartridge;
   an intermediate transfer member; and
   an impression mechanism;
   wherein the first liquid toner cartridge is configured to transfer transparent liquid toner to a first discharged portion of the photoconductor drum to form a first layer on the photoconductor drum, wherein the intermediate transfer member is configured to receive the first layer from the photoconductor drum, wherein the second liquid toner cartridge is configured to transfer pigmented liquid toner to a second discharged portion of the photoconductor drum to form a second layer on the photoconductor drum, wherein the intermediate transfer member is configured to receive the second layer from the photoconductor drum over the first layer, wherein the impression mechanism is configured to drive a substrate along the intermediate transfer member to cause the first layer and the second layer to be transferred to the substrate without sintering the second layer, and wherein the first layer and the second layer are not sintered prior to being transferred to the substrate.

2. The apparatus of claim 1 wherein the impression mechanism is configured to drive the substrate along the intermediate transfer member to cause substantially all of the first layer and the second layer to be transferred to the substrate.

3. The apparatus of claim 1 where the first discharged portion of the photoconductor drum comprises substantially all of a dischargable surface of the photoconductor drum.

4. The apparatus of claim 1 where the first discharged portion of the photoconductor drum comprises a selected portion of a dischargable surface of the photoconductor drum.

5. The apparatus of claim 4 further comprising:
   an imaging system configured to discharge the selected portion of the photoconductor drum.

6. The apparatus of claim 1 wherein the intermediate transfer member includes a blanket configured to receive the first layer and the second layer from the photoconductor drum.

7. The apparatus of claim 1 wherein the intermediate transfer member is configured to heat the blanket.

8. The apparatus of claim 1 wherein the impression mechanism is configured to apply pressure between the substrate and the intermediate transfer member to cause the first layer and the second layer to be transferred to the substrate.

9. A system comprising:
   means for generating a clear layer on a first surface using a transparent liquid toner;
   means for generating a color layer using a pigmented liquid toner over the clear layer on the first surface; and
   means for transferring the clear layer and the color layer from the first surface to a substrate without sintering the color layer, wherein the clear layer and the color layer are not sintered prior to being transferred to the substrate.

10. The system of claim 9 wherein the means for transferring includes means for transferring substantially all of the clear layer from the first surface to the substrate.

11. The system of claim 9 wherein the means for generating the clear layer includes means for generating the clear layer on substantially all of the first surface.

12. The system of claim 9 wherein the means for generating the clear layer includes means for generating the clear layer on a selected portion of the first surface.

13. The system of claim 9 further comprising:
   means for generating a first latent image associated with the clear layer on a second surface using an imaging system;
   means for forming the clear layer on the second surface; and
   means for transferring the clear layer from the second surface to the first surface.

14. The system of claim 9 further comprising:
   means for generating a first latent image associated with the clear layer on the first surface using an imaging system; and
   means for forming the clear layer on the first surface.

15. The system of claim 9 wherein the first surface comprises a blanket.

16. The system of claim 9 wherein the first surface comprises a belt.

* * * * *

UNITED STATES PATENT AND TRADEMARK OFFICE
CERTIFICATE OF CORRECTION

| | |
|---|---|
| PATENT NO. | : 7,773,916 B2 |
| APPLICATION NO. | : 12/353814 |
| DATED | : August 10, 2010 |
| INVENTOR(S) | : Bruce J Jackson et al. |

It is certified that error appears in the above-identified patent and that said Letters Patent is hereby corrected as shown below:

In column 9, line 42, in Claim 7, delete "claim 1" and insert -- claim 6 --, therefor.

Signed and Sealed this
Tenth Day of May, 2011

David J. Kappos
*Director of the United States Patent and Trademark Office*